United States Patent
Chen

(10) Patent No.: US 9,954,749 B2
(45) Date of Patent: Apr. 24, 2018

(54) DETECTION CIRCUIT AND DETECTING METHOD THEREOF

(71) Applicant: Getac Technology Corporation, Hsinchu County (TW)

(72) Inventor: Hung-Tu Chen, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 2 days.

(21) Appl. No.: 14/660,181

(22) Filed: Mar. 17, 2015

(65) Prior Publication Data

US 2016/0277266 A1 Sep. 22, 2016

(51) Int. Cl.
| H04M 1/04 | (2006.01) |
| H04L 12/26 | (2006.01) |
| H04L 12/24 | (2006.01) |
| H04M 1/725 | (2006.01) |

(52) U.S. Cl.
CPC .......... *H04L 43/0811* (2013.01); *H04L 41/06* (2013.01); *H04L 43/50* (2013.01); *H04M 1/72527* (2013.01); *H04M 1/04* (2013.01)

(58) Field of Classification Search
CPC ..... H04L 41/06; H04L 43/0811; H04L 43/50; H04M 1/72527; H04M 1/04
USPC .............. 455/557, 423, 556.1, 562.1, 575.7; 379/21, 26.01
See application file for complete search history.

(56) References Cited

U.S. PATENT DOCUMENTS

| 6,380,748 B1* | 4/2002 | Kang | G01R 27/06 324/645 |
| 6,744,853 B1* | 6/2004 | Van Rooyen | H04M 3/28 379/1.01 |
| 2007/0155347 A1* | 7/2007 | Heuermann | H03H 7/40 455/107 |
| 2008/0233890 A1* | 9/2008 | Baker | H03L 7/181 455/73 |
| 2009/0193157 A1* | 7/2009 | Chen | H04L 12/12 710/16 |
| 2012/0258661 A1* | 10/2012 | Nakayama | H04B 5/0081 455/41.1 |
| 2013/0120690 A1* | 5/2013 | Tsujii | G01R 31/041 349/69 |
| 2013/0210356 A1* | 8/2013 | Yuan | G06K 7/0008 455/41.2 |

* cited by examiner

Primary Examiner — Kamran Afshar
Assistant Examiner — Nicole Louis-Fils
(74) Attorney, Agent, or Firm — Locke Lord LLP; Tim Tingkang Xia, Esq.

(57) ABSTRACT

A detection circuit is used to detect a connection state between a first signal port of an electronic device and a first external device. The detection circuit includes a signal generator, a switch module, a signal detector, and a processing unit. The signal generator generates a test signal. During a test process, the signal generator is electrically connected to the first signal port by the switch module, such that the test signal is sent to the first signal port to test the connection state of the first signal port. The signal detector produces a detection signal according to the connection state of the first signal port. The processing unit determines the state of connection between the first signal port and the first external device by comparing the voltage of the detection signal with a threshold value.

20 Claims, 6 Drawing Sheets

DETECTION CIRCUIT AND DETECTING METHOD THEREOF

BACKGROUND OF THE INVENTION

Field of the Invention

The present invention relates to detection circuits and detecting methods thereof, and more particularly, to a detection circuit and a detecting method thereof for detecting the state of connection between a signal port and an external device.

Description of the Prior Art

Due to technological development, mobile electronic devices, such as cellular phones and tablets, are increasingly common. Users contact each other and watch movies at any time and any place with the mobile electronic devices. To meet the need for portability, the mobile electronic devices are each equipped with a built-in antenna for receiving wirelessly transmitted signals.

However, the built-in antenna has a small reception area, is rather ineffective in receiving wirelessly transmitted signals, and is susceptible to the deterioration of quality in transmitting signals and playing videos especially in a reception environment rife with weak signals. In view of this, some manufacturers begin expanding docks applicable to mobile electronic devices by disposing antenna slots in the docks so that wirelessly transmitted signals are received by external antennas connected to the docks when the mobile electronic devices are insertedly disposed on the dock, thereby enhancing the transmission quality of the mobile electronic devices.

Nonetheless, in the event of poor electrical connection between a mobile electronic device and a dock or between an external antenna and a dock because of a loose connection, a damaged antenna, a damaged port, or a misaligned port, for example, the signal transmission quality of the mobile electronic device will be unsatisfactory but remain unexplained.

SUMMARY OF THE INVENTION

In view of the aforesaid drawbacks of the prior art, the present invention provides a detection circuit and a detecting method for detecting a state of connection between a signal port of an electronic device and an external device, so as to prompt the user to perform inspection and/or adjustment upon discovery of an abnormal connection state.

In an embodiment, a detection circuit comprises a signal generator, a switch module, a signal detector and a processing unit. The signal generator generates a test signal. During a test process, the switch module turns on the signal generator, and then the test signal is sent to a first signal port to test the connection state of the first signal port. The signal detector produces a detection signal according to the connection state of the first signal port. The processing unit compares the voltage of the current detection signal with a threshold value to thereby determine the state of connection between the first signal port and a first external device.

In an embodiment, during a test process, a detecting method comprises the steps of: generating a test signal, sending the test signal to a first signal port, testing a connection state of the first signal port, producing a detection signal according to the connection state of the first signal port, and determining the state of connection between the first signal port and the first external device according to a result of comparison between a voltage of the current detection signal and a threshold value.

In conclusion, a detection circuit and a detecting method of the present invention are advantageously characterized in that: the state of connection between a signal port and an external device is determined by sending a test signal to the signal port to generate a detection signal and comparing the current detection signal with a threshold value; and, in case of an abnormal connection state, the user will be prompted to perform inspection and/or adjustment.

The embodiments below illustrate the features and advantages of the present invention to enable persons skilled in the art to gain insight into the present invention and implement the present invention accordingly. Persons skilled in the art can study the disclosure of the specification, claims, and drawings and thereby easily understand the objectives and advantages of the present invention.

DETAILED DESCRIPTION OF THE EMBODIMENTS

Figure 1:
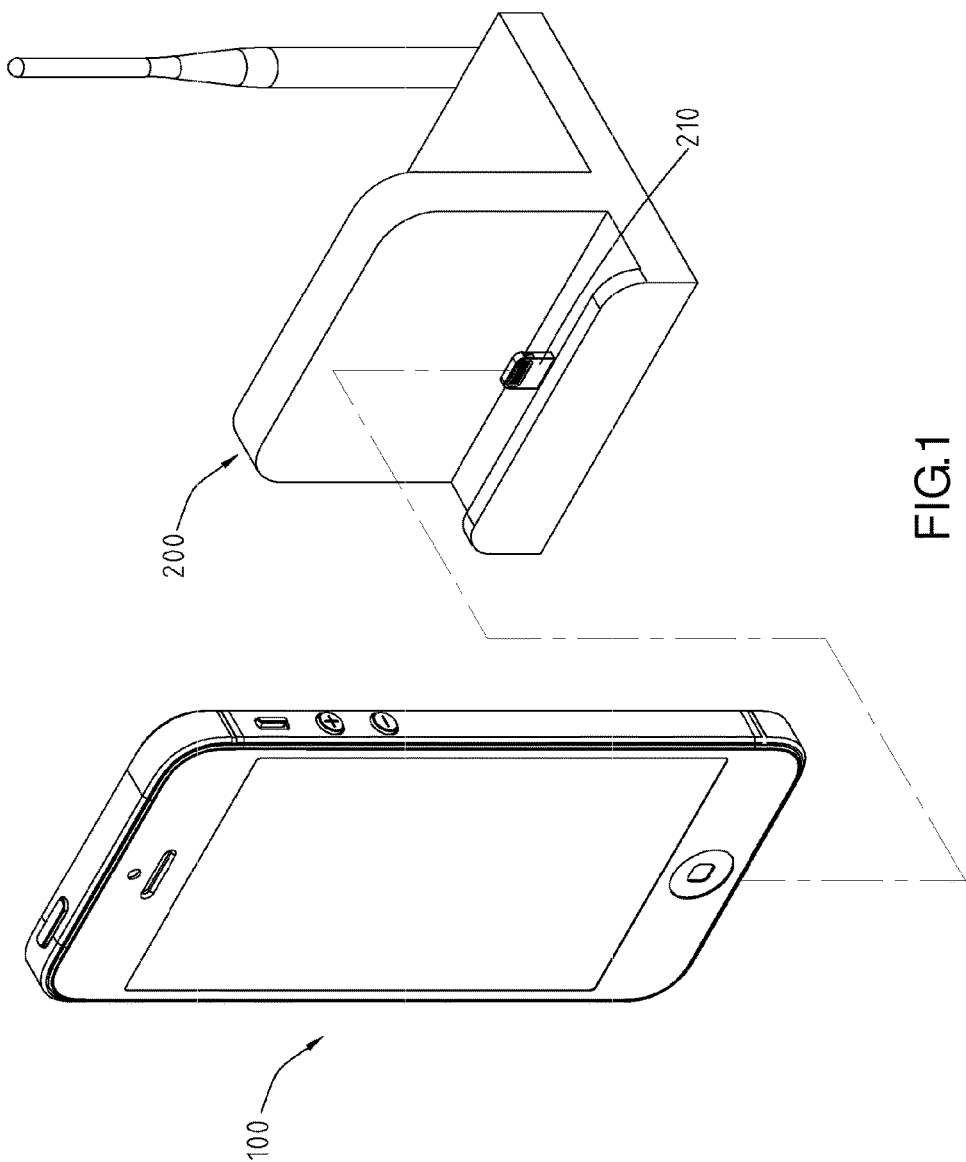
FIG. 1 is a perspective view of an electronic device provided with a detection circuit and connected to a first external device according to the first embodiment of the present invention.
Figure 2:
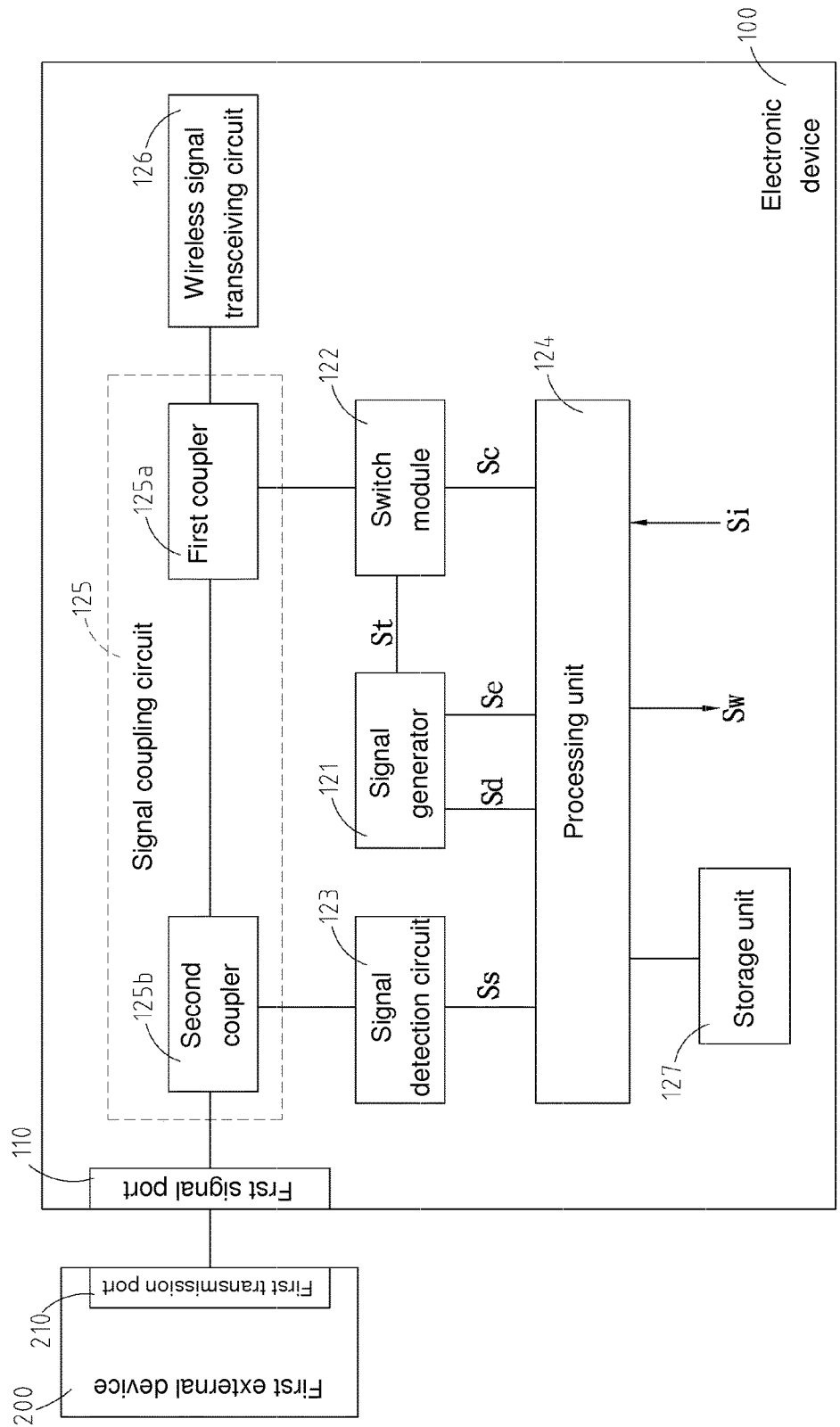
FIG. 2 is a circuit block diagram of the detection circuit according to the first embodiment of the present invention.

FIG. 1 is a perspective view of an electronic device provided with a detection circuit and connected to a first external device according to the first embodiment of the present invention. FIG. 2 is a circuit block diagram of the detection circuit according to the first embodiment of the present invention. Referring to FIG. 1 and FIG. 2, the detection circuit is for use in detecting the state of connection between an electronic device 100 and a first external device 200, wherein the detection circuit is disposed in the electronic device 100.

In this embodiment, the electronic device 100 is a mobile electronic device, such as a cellular phone or a tablet, whereas the first external device 200 is an external device, such as a dock, connectable to the electronic device 100, but the present invention is not limited thereto. The first external device 200 is connected to a first signal port 110 of the electronic device 100 through a first transmission port 210, such that the electronic device 100 performs communication by the first external device 200 and through the first signal port 110 and the first transmission port 210. Therefore, the first signal port 110 and the first transmission port 210 have two matched connection structures, respectively, such that the first signal port 110 and the first transmission port 210 can be separably connected.

The detection circuit essentially comprises a signal generator 121, a switch module 122, a signal detection circuit 123, a processing unit 124, and a signal coupling circuit 125.

The signal coupling circuit 125 further comprises a first coupler 125a and a second coupler 125b. In some embodiments, a wireless signal transceiving circuit 126 is a wireless network module of the electronic device 100, a mobile network module, a global positioning system (GPS) module, or a combination thereof, but the present invention is not limited thereto.

A control end (not shown) of the signal generator 121 connects with the processing unit 124 electrically and receives control signal Se from the processing unit 124. A control end (not shown) of the switch module 122 connects with the processing unit 124 electrically and receives control signal Sc from the processing unit 124. An input end (not shown) of the switch module 122 connects with the signal generator 121 electrically and receives test signal St from the signal generator 121. A first end (not shown) of the first coupler 125a of the signal coupling circuit 125 connects electrically with an output end (not shown) of the switch module 122 and receives test signal St from the switch module 122. A second end (not shown) of the first coupler 125a of the signal coupling circuit 125 is electrically connected to the wireless signal transceiving circuit 126. A third end of the first coupler 125a of the signal coupling circuit 125 is coupled to a first end of the second coupler 125b of the signal coupling circuit 125. A second end (not shown) of the second coupler 125b of the signal coupling circuit 125 is electrically connected to the first signal port 110. The signal generator 121 is electrically connected to the first signal port 110 through the switch module 122 and the signal coupling circuit 125, such that test signal St generated from the signal generator 121 can be sent to the first signal port 110. The wireless signal transceiving circuit 126 is electrically connected to the first signal port 110 through the signal coupling circuit 125. An input end (not shown) of the signal detection circuit 123 is electrically connected to a third end (not shown) of the second coupler 125b of the signal coupling circuit 125. The signal detection circuit 123 is electrically connected to the first signal port 110 indirectly through the signal coupling circuit 125 to receive a portion attributed to test signal St reflected off the first signal port 110. An input end (not shown) of the processing unit 124 connects electrically with an output end (not shown) of the signal detection circuit 123 and receives detection signal Ss from the signal detection circuit 123. A start-enabling end of the processing unit 124 receives a start signal Si for starting a test process.

In an embodiment, when the user connects the first signal port 110 of the electronic device 100 with the first transmission port 210 of the first external device 200, the connection of the first signal port 110 and the first transmission port 210 effectuates the ON state of a specific pin (such as a ground pin) of the first signal port 110 to thereby generate start signal Si. In another embodiment, start signal Si is generated as a result of the user's execution of a test software installed on the electronic device 100.

During the test process, the signal generator 121 generates test signal St with different frequencies according to control signal Se. In an embodiment, the signal generator 121 is a voltage-controlled oscillator (VCO) for sending test signal St with different frequencies according to a specific voltage level (control signal Se) generated from the processing unit 124.

During the test process, the switch module 122 is turned on in response to control signal Sc, such that the signal generator 121 and the first signal port 110 are turned on. After the signal generator 121 and the first signal port 110 have been turned on, test signal St is sent from the signal generator 121 to the first signal port 110 through the switch module 122 and the signal coupling circuit 125 in order to test the connection state of the first signal port 110. Test signal St sent through the switch module 122 is coupled by the first coupler 125a and the second coupler 125b of the signal coupling circuit 125 to the first signal port 110 in order to test its connection state. The signal detection circuit 123 receives, through the second coupler 125b of the signal coupling circuit 125, a portion (indicative of the connection state of the first signal port 110) attributed to test signal St reflected off the first signal port 110 to thereby produce detection signal Ss accordingly. Therefore, the signal detection circuit 123 produces detection signal Ss according to the connection state of the first signal port 110. The processing unit 124 determines the state of connection between the first signal port 110 and the first external device 200 by comparing the voltage of detection signal Ss with a threshold value.

In some embodiments, the signal detection circuit 123 functions as an amplifier for amplifying received signals and rendering the amplified signals available to the processing unit 124, wherein the gain depends on designers' needs. In this regard, detection signal Ss is deemed a portion attributed to test signal St reflected off the first signal port 110.

In some embodiments, the processing unit 124 is a micro control unit (MCU), but the present invention is not limited thereto.

The detection circuit further comprises a storage unit 127 for storing a threshold value to allow the processing unit 124 to retrieve the threshold value from the storage unit 127 and compare the threshold value with the voltage of detection signal Ss. In this regard, the storage unit 127 is a volatile memory or a non-volatile memory, such as a random access memory (RAM), a read-only memory (ROM), or an electrically erasable programmable read-only memory (EEPROM).

Figure 3:
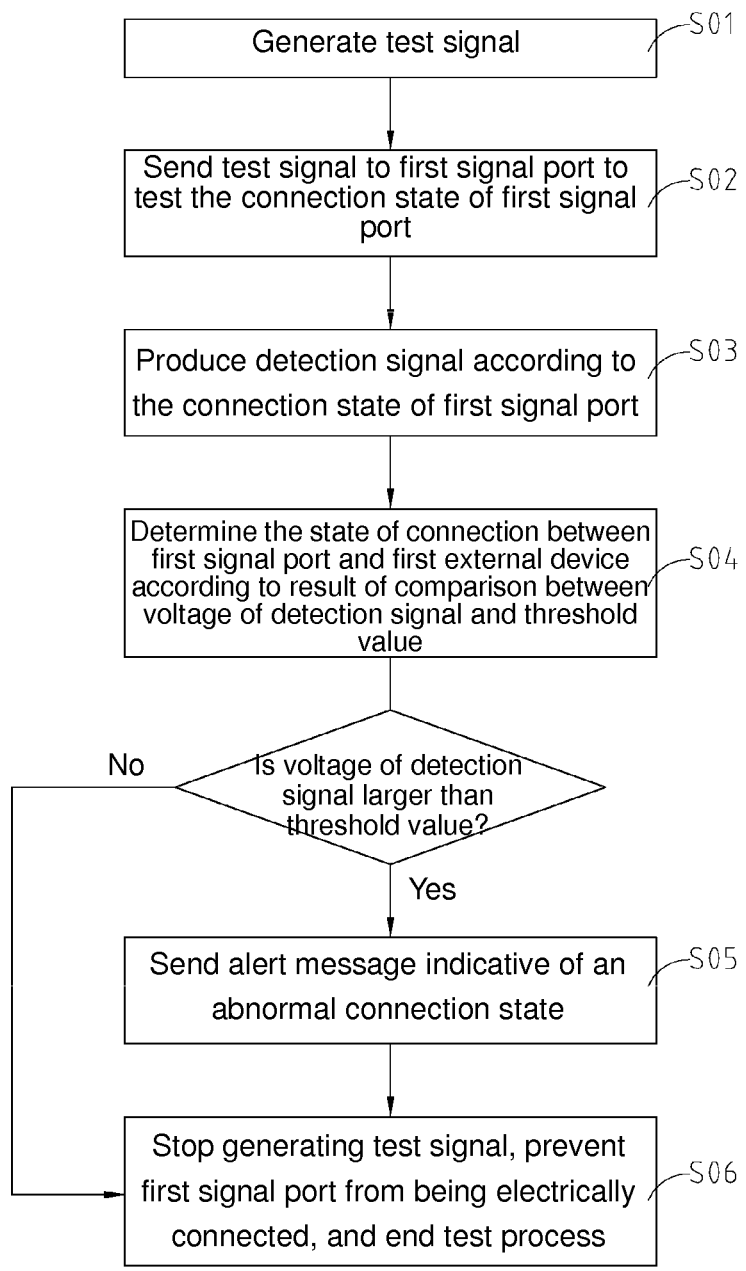
FIG. 3 is a flowchart of a detecting method according to the first embodiment of the present invention.

FIG. 3 is a flowchart of a detecting method according to the first embodiment of the present invention. Referring to FIG. 3, the detecting method comprises the steps of: generating test signal St (step S01); sending test signal St to the first signal port 110 and testing the connection state of the first signal port 110 (step S02); producing detection signal Ss according to the connection state of the first signal port 110 (step S03); and determining the state of connection between the first signal port 110 and the first external device 200 according to a result of comparison between the voltage of detection signal Ss and the threshold value (step S04).

In step S01, the processing unit 124 starts a test process according to the received start signal Si so as to generate and send control signal Se to the signal generator 121. The signal generator 121 generates test signal St according to control signal Se.

In step S02, the processing unit 124 generates and sends control signal Sc to the switch module 122 for controlling the starting and turning off the switch module 122, such that the switch module 122 effectuates the electrical connection between the signal generator 121 and the first signal port 110 according to control signal Sc, and in consequence test signal St is sent to the first signal port 110 to test the connection state of the first signal port 110.

In some embodiments, the processing unit 124 controllably drives the signal generator 121 to generate test signal St, and it is not until test signal St gets stable that the processing unit 124 generates control signal Sc to controllably drive the switch module 122 to allow the electrical connection between the signal generator 121 and the first signal port 110, but the present invention is not limited thereto. That is to say, the processing unit 124 simultaneously generates control signal Se and control signal Sc for controlling the signal generator 121 and the switch module 122.

After test signal St is sent to the first signal port 110, test signal St undergoes reflection. That is to say, the first signal port 110 sends back reflection signals at different reflection levels in accordance with the state of connection (for example, whether they are loosely connected, whether the antenna is damaged, whether the port is damaged, or whether the port is misaligned) between the first signal port 110 and the first transmission port 210 of the first external device 200. Therefore, the detection circuit sends a portion attributed to test signal St reflected off the first signal port 110 to the signal detection circuit 123 through the first coupler 125a and the second coupler 125b of the signal coupling circuit 125, such that the processing unit 124 determines the connection state of the first signal port 110 accordingly.

In step S03, the signal detection circuit 123 detects the state of connection between the first signal port 110 and the first external device 200 according to the magnitude of the portion attributed to test signal St reflected off the first signal port 110 to thereby produce detection signal Ss accordingly. Therefore, the signal detection circuit 123 receives a reflection signal through the second coupler 125b of the signal coupling circuit 125 to thereby produce detection signal Ss accordingly.

In step S04, the processing unit 124 receives detection signal Ss from the signal detection circuit 123 and compares the voltage of detection signal Ss with the threshold value, so as to determine the state of connection between the first signal port 110 and the first external device 200.

In general, after test signal St has been sent to the first signal port 110, if the state of connection between the first signal port 110 of the electronic device 100 and the first transmission port 210 of the first external device 200 is abnormal (for example, loosely connected, damaged, or misaligned), test signal St will have its reflection coefficient increased, because it experiences increased impedance at the first signal port 110.

Therefore, if the processing unit 124 compares the voltage of detection signal Ss with a threshold value and determines that the voltage of detection signal Ss is larger than the threshold value, the detecting method will go to step S05, such that the processing unit 124 sends alert message Sw indicative of the abnormal state of connection between the first signal port 110 and the first external device 200, and in consequence the electronic device 100 informs the user of the abnormal connection state in accordance with alert message Sw and by means of a graphical and text-based alert or a sound alert.

In some embodiments, before determining the state of connection between the first signal port 110 and the first external device 200 with detection signal Ss, the processing unit 124 converts detection signal Ss into a digital signal value with an analog-to-digital converter (ADC) and then compares the digital signal value with a threshold value so as to determine the state of connection between the first signal port 110 and the first external device 200. It is not until the processing unit 124 determines the digital signal value is larger than the threshold value that the process flow of the detecting method goes to step S05 which requires the processing unit 124 to send alert message Sw indicative of the abnormal state of connection between the first signal port 110 and the first external device 200. Therefore, the threshold value is a preset voltage value or a preset digital value.

The detecting method further comprises stopping generating test signal St, such that the first signal port 110 is turned off, and ends the test process (step S06). In step S06, the processing unit 124 sends disable signal Sd which not only shuts down the signal generator 121 and thus prevents the signal generator 121 from generating test signal St but also disables the operation of the switch module 122 and thus precludes electrical connection between the signal generator 121 and the first signal port 110, thereby ending the test process. The processing unit 124 not only disables the operation of the switch module 122 and thus severs the electrical connection between the signal generator 121 and the first signal port 110 but also directly sends disable signal Sd for stopping the operation of the signal generator 121 and thus saving energy by reducing overall power consumption. However, the present invention is not limited to the above-mentioned. Hence, in an embodiment of the present invention, the processing unit 124 only disables the operation of the switch module 122 and thus severs the electrical connection between the signal generator 121 and the first signal port 110.

Therefore, if the processing unit 124 determines the state of connection between the first signal port 110 and the first external device 200 according to the result of the comparison between detection signal Ss and the threshold value and determines that the voltage of detection signal Ss is larger than the threshold value, step S05 and step S06 will begin consecutively, so as to send alerts and reduce overall power consumption. Conversely, if the processing unit 124 determines that the voltage of detection signal Ss is lower than the threshold value, the process flow of the detecting method will go directly to step S06 for reducing power consumption.

Figure 4:
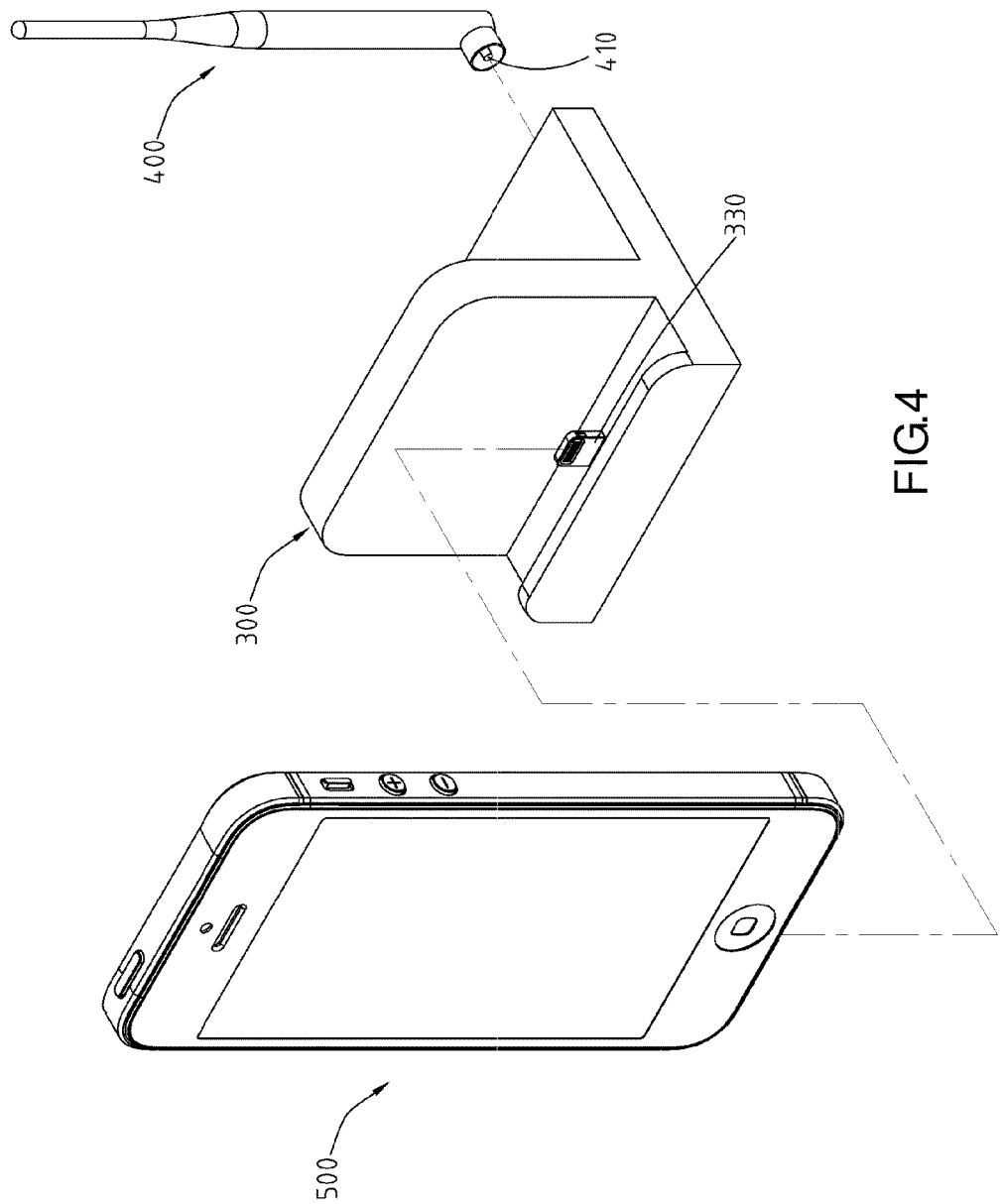
FIG. 4 is a perspective view of an electronic device provided with a detection circuit and connected to a first external device and a second external electronic device according to the second embodiment of the present invention.
Figure 5:
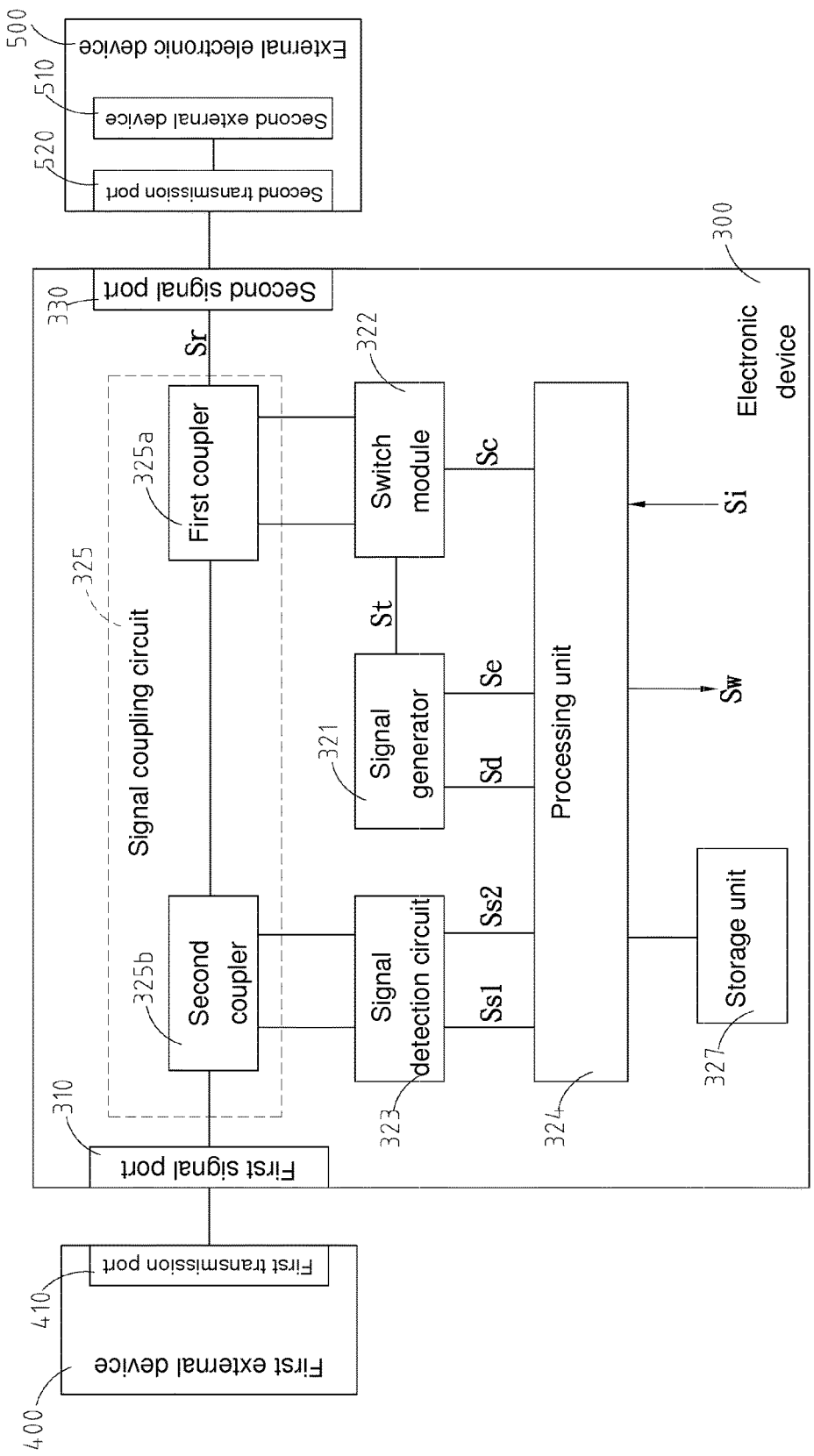
FIG. 5 is a circuit block diagram of the detection circuit according to the second embodiment of the present invention.

FIG. 4 is a perspective view of an electronic device provided with a detection circuit and connected to a first external device and a second external electronic device according to the second embodiment of the present invention. FIG. 5 is a circuit block diagram of the detection circuit according to the second embodiment of the present invention. Referring to FIG. 4 and FIG. 5, the detection circuit not only detects the state of connection between a first signal port 310 of an electronic device 300 and a first external device 400 but also detects the state of the matching of a second signal port 330 of the electronic device 300 and a second external device 510. The second signal port 330 is adapted to electrically connect with the second external device 510. The detection circuit is disposed in the electronic device 300.

In this embodiment, the electronic device 300 is a dock, whereas the first external device 400 and the second external device 510 are an external antenna (i.e., an external antenna for the dock) and a wireless signal transceiving circuit of another electronic device (hereinafter referred to as an external electronic device 500), respectively. The wireless signal transceiving circuit of the external electronic device 500 is a wireless network module, a mobile network module, a global positioning system (GPS) module, or a combination thereof, but the present invention is not limited thereto. The external electronic device 500 is a mobile electronic device, such as a cellular phone or a tablet.

A first transmission port 410 of the first external device 400 connects with the first signal port 310 of the electronic device 300, whereas a second transmission port 520 of the second external device 510 connects with the second signal port 330 of the electronic device 300, such that the second external device 510 communicates with the first external device 400 through the electronic device 300.

The detection circuit essentially comprises a signal generator 321, a switch module 322, a signal detection circuit 323, a processing unit 324, and a signal coupling circuit 325. The signal coupling circuit 325 further comprises a first coupler 325a and a second coupler 325b.

A control end (not shown) of the signal generator 321 connects with the processing unit 324 electrically and receives enable signal Se from the processing unit 324. An input end (not shown) of the switch module 322 connects with an output end (not shown) of the signal generator 321 electrically and receives test signal St from the signal generator 321. A control end (not shown) of the switch module 322 connects with the processing unit 324 electrically and receives control signal Sc from the processing unit 324. Two input ends (not shown) of the signal coupling circuit 325 connect with the switch module 322 electrically and receive test signal St from the switch module 322. A first transmission end (not shown) of the signal coupling circuit 325 connects with the first signal port 310 electrically to thereby send test signal St to the first signal port 310 and receive a portion attributed to test signal St reflected off the first signal port 310. A second transmission end (not shown) of the signal coupling circuit 325 connects with the second signal port 330 electrically to thereby send test signal St to the second signal port 330 and receive reflection signal Sr attributed to test signal St and reflected off the second signal port 330. The first coupler 325a of the signal coupling circuit 325 is coupled between the switch module 322 and the second signal port 330. The second coupler 325b of the signal coupling circuit 325 is coupled among the first coupler 325a, the first signal port 310, and the signal detection circuit 323. Two input ends (not shown) of the signal detection circuit 323 connect electrically with two output ends (not shown) of the signal coupling circuit 325, respectively, and receive a portion attributed to test signal St and reflected off the first signal port 310 as well as reflection signal Sr attributed to test signal St reflected off the second signal port 330. Two input ends (not shown) of the processing unit 324 connect electrically with an output end (not shown) of the signal detection circuit 323 and receive detection signals Ss1, Ss2 from the signal detection circuit 323, respectively. A start-enabling end (not shown) of the processing unit 324 receives start signal Si for starting the test process.

In an embodiment, when the user connects the first signal port 310 of the electronic device 300 with the first transmission port 410 of the first external device 400 and/or connects the second signal port 330 of the electronic device 300 with a second transmission port 520 of the external electronic device 500, the connection of the first signal port 310 and the first transmission port 410 effectuates the ON state of a specific pin (such as a ground pin) of the first signal port 310, and/or the connection of the second signal port 330 and the second transmission port 520 effectuates the ON state of a specific pin of the second signal port 330, so as to generate start signal Si. In another embodiment, start signal Si is generated as a result of the user's execution of a test software installed on the electronic device 300.

During the test process, the signal generator 321 generates test signal St with different frequencies according to control signal Se. In an embodiment, the signal generator 321 is a voltage-controlled oscillator (VCO) for sending test signal St with different frequencies according to a specific voltage level (control signal Se) generated from the processing unit 324.

During the test process, the switch module 322 is turned on in response to control signal Sc, so as to turn on the signal generator 321 and the first signal port 310 or turn on the signal generator 321 and the second signal port 330. After the signal generator 321 and the first signal port 310 have been turned on, test signal St is sent from the signal generator 321 to the first signal port 310 through the switch module 322 and the signal coupling circuit 325 to test the connection state of the first signal port 310. When the signal generator 321 and the second signal port 330 are turned on, test signal St is sent from the signal generator 321 to the second signal port 330 through the switch module 322 and the signal coupling circuit 325 to test the matching state of the second signal port 330. Test signal St sent through the switch module 322 is coupled out by the first coupler 325a of the signal coupling circuit 325. The coupled test signal St is sent to the second signal port 330 to test its matching state. Alternatively, the coupled test signal St is sent to the first signal port 310 through the second coupler 325b to test its connection state. Reflection signal Sr, which is reflected off the second signal port 330 and sent from the first coupler 325a to the second coupler 325b, is coupled out by the second coupler 325b of the signal coupling circuit 325; alternatively, a portion attributed to test signal St reflected off the first signal port 310 is coupled out by the second coupler 325b of the signal coupling circuit 325. The signal detection circuit 323 receives, through the second coupler 325b of the signal coupling circuit 325, a portion (indicative of the connection state of the first signal port 310) attributed to test signal St reflected off the first signal port 310 and thus produces detection signal Ss1 accordingly; alternatively, the signal detection circuit 323 receives, through the second coupler 325b of the signal coupling circuit 325, reflection signal Sr (indicative of the matching state of the second signal port 330) attributed to test signal St reflected off the second signal port 330 and thus produces detection signal Ss2 accordingly. The signal detection circuit 323 produces detection signals Ss1, Ss2 according to the connection state of the first signal port 310 or the matching state of the second signal port 330. The processing unit 324 determines the state of connection between the first signal port 310 and the first external device 400 by comparing the voltage of detection signal Ss1 with the threshold value. Alternatively, the processing unit 324 determines the state of the matching of the second signal port 330 and the second external device 510 by comparing the voltage of detection signal Ss2 with the threshold value.

In some embodiments, the signal detection circuit 323 functions as an amplifier for amplifying received signals and rendering the amplified signals available to the processing unit 324, wherein the gain depends on designers' needs. In this regard, detection signal Ss1 is deemed a portion attributed to test signal St reflected off the first signal port 310, whereas detection signal Ss2 is deemed reflection signal Sr attributed to test signal St reflected off the second signal port 330.

The detection circuit further comprises a storage unit 327 for storing a threshold value to allow the processing unit 324 to retrieve the threshold value from the storage unit 327 and compare the threshold value with the voltage of detection signals Ss1, Ss2. In this regard, the storage unit 327 is a volatile memory or a non-volatile memory, such as a random access memory (RAM), a read-only memory (ROM), or an electrically erasable programmable read-only memory (EEPROM).

Figure 6:
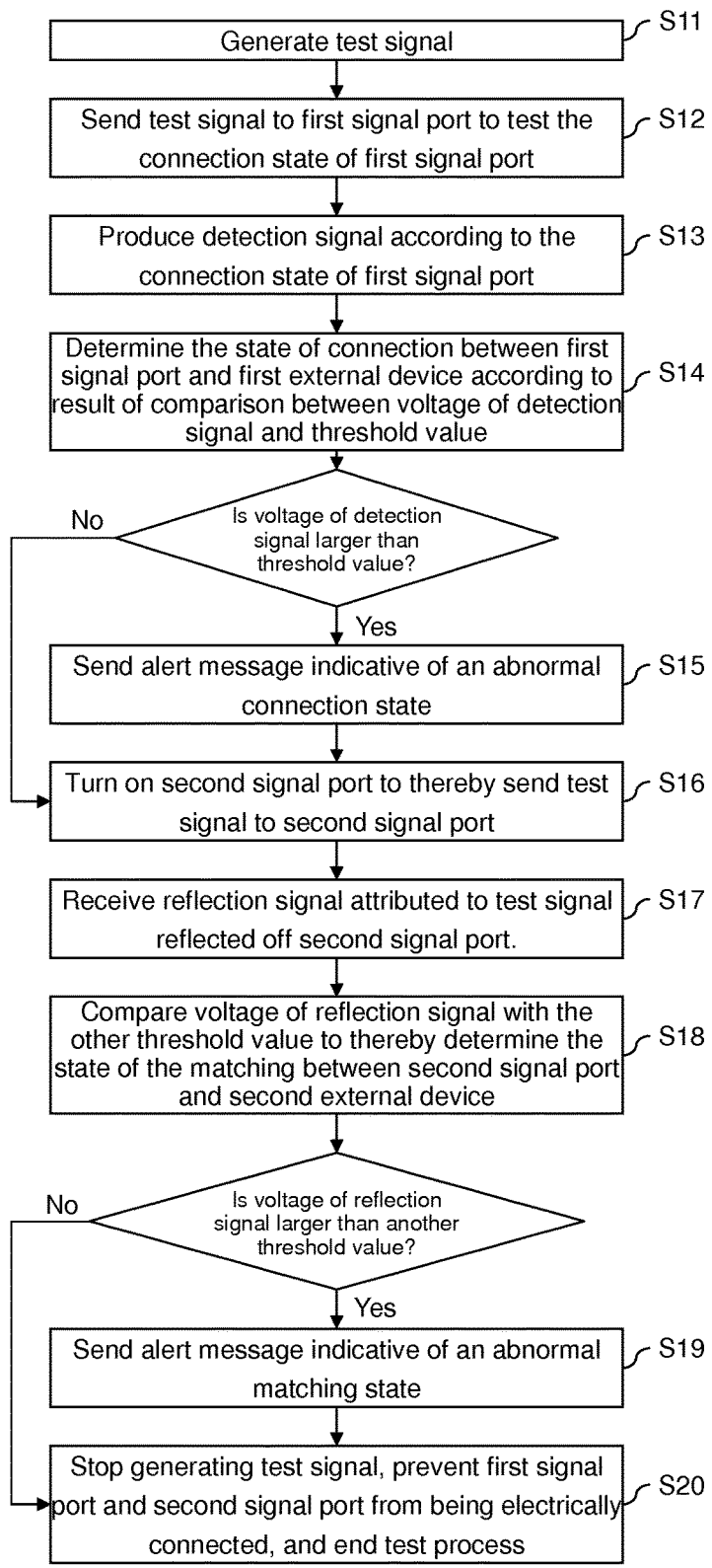
FIG. 6 is a flowchart of the detecting method according to the second embodiment of the present invention.

FIG. 6 is a flowchart of the detecting method according to the second embodiment of the present invention. Referring to FIG. 6, the detecting method comprises the steps of: generating test signal St (step S11); sending test signal St to the first signal port 310 and testing the connection state of the first signal port 310 (step S12); producing detection signal Ss1 according to the connection state of the first signal port 310 (step S13); determining the state of connection between the first signal port 310 and the first external device 400 according to a result of comparison between the voltage of detection signal Ss1 and a threshold value (step S14); sending an alert message Sw indicative of an abnormal connection state (step S15); turning on the second signal port 330 and thus sending test signal St to the second signal port 330 (step S16); receiving reflection signal Sr attributed to test signal St reflected off the second signal port 330 (step S17); comparing the voltage of reflection signal Sr with the other threshold value to thereby determine the state of the matching of the second signal port 330 and the second external device 510 (step S18); sending an alert message Sw indicative of an abnormal matching state (step S19); and stopping generating test signal St, such that the first signal port 310 and the second signal port 330 are turned off, and ending the test process (step S20).

In step S11, the processing unit 324 starts a test process according to the received start signal Si to thereby generate and send control signal Se to the signal generator 321. The signal generator 321 generates test signal St according to control signal Se.

In addition, the processing unit 324 generates and sends control signal Sc to the switch module 322 for controlling the starting, turning off, and transmission direction of the switch module 322. Afterward, depending on control signal Sc, the switch module 322 chooses a link for connecting the signal generator 321 and the first signal port 310 electrically; hence, test signal St is sent to the first signal port 310 to test the connection state of the first signal port 310. Alternatively, depending on control signal Sc, the switch module 322 chooses a link for connecting the signal generator 321 and the second signal port 330 electrically; hence, test signal St is sent to the second signal port 330 to test the matching state of the second signal port 330. The illustrative description below is about testing the connection state of the first signal port 310 and then testing the matching state of the second signal port 330, but the present invention is not limited thereto.

In step S12, the switch module 322 allows the electrical connection between the signal generator 321 and the first signal port 310 according to control signal Sc such that test signal St is sent, through the first coupler 325*a* and the second coupler 325*b* of the signal coupling circuit 325, to the first signal port 310 for testing the state of connection between the first signal port 310 and the first external device 400.

After test signal St is sent to the first signal port 310, test signal St undergoes reflection. That is to say, the first signal port 310 sends back reflection signals at different reflection levels in accordance with the state of connection (for example, whether they are loosely connected, whether the antenna is damaged, whether the port is damaged, or whether the port is misaligned) between the first signal port 310 and the first transmission port 410 of the first external device 400. Therefore, the detection circuit sends a portion attributed to test signal St reflected off the first signal port 310 to the signal detection circuit 323 through the second coupler 325*b* of the signal coupling circuit 325, such that the processing unit 324 determines the connection state of the first signal port 310 accordingly.

In step S13, the signal detection circuit 323 detects the state of connection between the first signal port 310 and the first external device 400 according to the magnitude of the portion attributed to test signal St reflected off the first signal port 310 to thereby produce detection signal Ss1 accordingly. Therefore, the signal detection circuit 323 receives reflection signal through the second coupler 325*b* of the signal coupling circuit 325 to thereby produce detection signal Ss1 accordingly.

In step S14, the processing unit 324 receives detection signal Ss1 from the signal detection circuit 323, retrieves a threshold value from the storage unit 327, and compares the retrieved threshold value with the voltage of detection signal Ss1, so as to determine the state of connection between the first signal port 310 and the first external device 400.

If the processing unit 324 compares the voltage of detection signal Ss1 with the threshold value and determines that the voltage of detection signal Ss1 is larger than the threshold value, the process flow of the detecting method will go to step S15 and step S16. In step S15, the processing unit 324 sends alert message Sw indicative of the abnormal state of connection between the first signal port 310 and the first external device 400, such that the electronic device 300 can subsequently inform the user of the abnormal connection state in accordance with alert message Sw and by means of a graphical and text-based alert or a sound alert. However, if the processing unit 324 determines that the voltage of detection signal Ss1 is lower than or equal to the threshold value, the process flow of the detecting method will go to step S16 for detecting the connection state of the next signal port.

In some embodiments, the processing unit 324 converts detection signal Ss1 into a digital signal value with an analog-to-digital converter (ADC) and then compares the digital signal value with a threshold value so as to determine the state of connection between the first signal port 310 and the first external device 400. When the processing unit 324 determines that the digital signal value is larger than the threshold value. The processing unit 324 sends alert message Sw indicative of the abnormal state of connection between the first signal port 310 and the first external device 400 when the processing unit 324 determines that the digital signal value is larger than the threshold value. Therefore, the threshold value is a preset voltage value or a preset digital value.

In step S16, the switch module 322 switches from the link of electrical connection between test signal St and the first signal port 310 to the link of electrical connection between test signal St and the second signal port 330 according to control signal Sc, so as to send test signal St to the second signal port 330 through the first coupler 325*a* of the signal coupling circuit 325 in order to test the state of the matching of the second signal port 330 and the second external device 510.

After test signal St is sent to the second signal port 330, test signal St undergoes reflection. That is to say, the second signal port 330 sends back reflection signals at different reflection levels in accordance with the state of the matching (for example, whether they are loosely connected, whether the antenna is damaged, whether the port is damaged, or whether the port is misaligned) of the second signal port 330 and the second transmission port 520 of the second external device 510. Therefore, the detection circuit sends a portion (reflection signal Sr) attributed to test signal St reflected off the second signal port 330 to the signal detection circuit 323 through the first coupler 125*a* and the second coupler 125*b* of the signal coupling circuit 325, such that the processing unit 324 determines the matching state of the second signal port 330 accordingly.

In step S17, the signal detection circuit 323 detects the state of the matching of the second signal port 330 and the second external device 510 according to reflection signal Sr attributed to test signal St reflected off the second signal port 330 to thereby produce detection signal Ss2. Therefore, the signal detection circuit 323 receives reflection signal Sr through the second coupler 325b of the signal coupling circuit 325 to thereby produce detection signal Ss2 accordingly.

In step S18, the processing unit 324 receives detection signal Ss2 from the signal detection circuit 323, retrieves another threshold value from the storage unit 327, and compares the retrieved threshold value with the voltage of detection signal Ss2, so as to determine the state of the matching between the second signal port 330 and the second external device 510.

In general, after test signal St has been sent to the second signal port 330, if the state of connection between the second signal port 330 of the electronic device 300 and the second transmission port 520 of the second external device 510 is abnormal (for example, loosely connected, damaged, or misaligned), test signal St will have its reflection coefficient increased, because it experiences increased impedance at the second signal port 330.

Therefore, if the processing unit 324 compares the voltage of reflection signal Sr with the other threshold value and determines that the voltage of reflection signal Sr is larger than the other threshold value, the detecting method will go to step S19, such that the processing unit 324 sends alert message Sw indicative of the abnormal state of the matching between the second signal port 330 and the second external device 510, and in consequence the electronic device 300 informs the user of the abnormal matching state in accordance with alert message Sw and by means of a graphical and text-based alert or a sound alert.

In some embodiments, to compare reflection signal Sr with the other threshold value, the processing unit 324 converts reflection signal Sr into a digital signal value with an analog-to-digital converter (ADC) and then compares the digital signal value with the other threshold value. The processing unit 324 sends alert message Sw indicative of an abnormal state of the matching of the second signal port 330 and the second external device 510 when the processing unit 324 determines that the digital signal value is larger than the other threshold value. Therefore, the other threshold value is a preset voltage value or a preset digital value.

In some embodiments, step S14 and step S18 are executed simultaneously, that is to say, upon completion of the execution of step S13, the detection circuit 323 stores detection signal Ss1 in the storage unit 327 and then executes step S16 and step S17. Upon completion of the execution of step S16 and step S17, the processing unit 324 of the detection circuit 323 compares detection signal Ss1 with a threshold value and compares reflection signal Sr with another threshold value. Therefore, step S14 and step S18 are simultaneously executed after step S16 and step S17 have been executed.

The detecting method further comprises stopping generating test signal St, such that the first signal port 310 and the second signal port 330 are turned off, and ends the test process (step S20). In step S20, the processing unit 324 sends disable signal Sd which not only shuts down the signal generator 321 and thus prevents the signal generator 321 from generating test signal St but also disables the operation of the switch module 322 and thus precludes electrical connection between the signal generator 321, the first signal port 310, and the second signal port 330, thereby ending the test process. The processing unit 324 not only disables the operation of the switch module 322 and thus severs the electrical connection between the signal generator 321, the first signal port 310 and the second signal port 330 but also directly sends disable signal Sd for stopping the operation of the signal generator 321 and thus saving energy by reducing overall power consumption. However, the present invention is not limited to the above-mentioned. Hence, in an embodiment of the present invention, the processing unit 324 only disables the operation of the switch module 322 and thus severs the electrical connection between the signal generator 321, the first signal port 310, and the second signal port 330.

Therefore, if the processing unit 324 determines the state of the matching between the second signal port 330 and the second external device 510 according to the result of the comparison between reflection signal Sr and another threshold value and determines that the voltage of reflection signal Sr is larger than the other threshold value, step S19 and step S20 will begin consecutively, so as to send an alert and reduce overall power consumption. Conversely, if the processing unit 324 determines that the voltage of reflection signal Sr is lower than or equal to the other threshold value, the process flow of the detecting method will go directly to step S20 for reducing power consumption.

In conclusion, a detection circuit and a detecting method of the present invention are advantageously characterized in that: the state of connection between a signal port and an external device is determined by sending a test signal to the signal port to generate a detection signal and comparing the current detection signal with a threshold value; and, in case of an abnormal connection state, the user will be prompted to perform inspection and/or adjustment.

The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A detection circuit for detecting a state of connection between a first signal port of an electronic device and a first external device, the detection circuit comprising:

a signal generator, a switch module, a signal coupling circuit, a signal detector and a processing unit, wherein the signal generator, the switch module, the signal detector and the first signal port are electrically connected with the processing unit, the signal generator is electrically connected directly with the switch module, the switch module is electrically connected with the signal coupling circuit, the signal coupling circuit comprises a first coupler and a second coupler that has three connection ends, and is electrically connected directly with both the first signal port and the signal detector through a first connection end and a second connection end of the second coupler, and the signal coupling circuit and the signal detector are electrically connected in series between the first signal port and the processing unit; and wherein:

upon receiving a start signal by the processing unit, the processing unit sends an enable signal to the signal generator and a control signal to the switch module, upon receiving the enable signal, the signal generator is enabled and sends a test signal to the switch module, upon receiving the control signal, the switch module is turned on to receive the test signal from the signal generator, and sends the received test signal to the signal coupling circuit through the first coupler, and the signal coupling circuit then sends the test signal from a third connection end of the second coupler to the first signal port, upon receiving the test signal from the signal coupling circuit, the first signal port generates a reflect signal according to the received test signal, and sends the reflect signal through the signal coupling circuit to the signal detector, upon receiving the reflect signal, the signal detector generates a detection signal and sends the detection signal to the processing unit, and upon receiving the detection signal, the processing unit determines the state of connection between the first signal port of the electronic device and the first external device by comparing the detection signal with a predetermined threshold value.

2. The detection circuit of claim 1, wherein, when the processing unit determines that the voltage of the detection signal is larger than the threshold value, the processing unit sends an alert message indicative of the abnormal connection state.

3. The detection circuit of claim 1, wherein the processing unit converts the detection signal into a digital signal value, and the processing unit sends an alert message indicative of the abnormal connection state when the processing unit determines that the digital signal value is larger than the threshold value.

4. The detection circuit of claim 1, further comprising a storage unit for storing the threshold value, and after retrieving the threshold value from the storage unit, the processing unit determines the state of connection between the first signal port and the first external device according to the detection signal and the threshold value.

5. The detection circuit of claim 1, wherein, after determining the state of connection between the first signal port and the first external device, the processing unit sends a disable signal for shutting down the signal generator and turning off the switch module, such that the signal generator fails to turn on the first signal port and thereby ends the test process.

6. The detection circuit of claim 1, further comprising a wireless signal transceiving circuit electrically connected to the first signal port through the signal coupling circuit.

7. The detection circuit of claim 6, wherein the wireless signal transceiving circuit is a wireless network module, a mobile network module, a global positioning system (GPS) module, or a combination thereof.

8. The detection circuit of claim 5, further comprising:
a second signal port adapted to electrically connect with a second external device; and
a signal coupling circuit coupled among the second signal port, the first signal port, and the signal detector.

9. The detection circuit of claim 8, wherein the signal coupling circuit comprises:
a first coupler coupled between the second signal port and the switch module; and
a second coupler coupled among the first coupler, the first signal port, and the signal detector.

10. The detection circuit of claim 8, wherein the first external device and the second external device are provided in form of an external antenna and a wireless signal transceiving circuit of an external electronic device, respectively, wherein the wireless signal transceiving circuit is a wireless network module, a mobile network module, a global positioning system (GPS) module, or a combination thereof.

11. The detection circuit of claim 8, wherein, after the processing unit determines the state of connection between the first signal port and the first external device, the processing unit further controls the switch module to turn on the signal generator and the second signal port; meanwhile the signal detector further receives a reflection signal attributed to the test signal reflected off the second signal port, and then the processing unit compares the voltage of the reflection signal with the other threshold value to determine a state of matching between the second signal port and the second external device.

12. The detection circuit of claim 11, wherein, after determining that, the processing unit sends an alert message indicative of the abnormal matching state when the processing unit determines that the voltage of the reflection signal is larger than the other threshold value.

13. The detection circuit of claim 11, wherein, after determining the state of the matching between the second signal port and the second external device, the processing unit sends a disable signal for shutting down the signal generator and turning off the switch module, such that both of the first signal port and the second signal port fail to turn on the signal generator, and thereby ends the test process.

14. A detecting method for detecting a state of connection between a first signal port in an electronic device and a first external device, the detection circuit comprising a signal generator, a switch module, a signal coupling circuit, a signal detector and a processing unit, wherein the signal generator is electrically connected directly with the switch module, the signal coupling circuit comprises a first coupler and a second coupler that has three connection ends and is electrically connected directly with both the first signal port and the signal detector through a first connection end and a second connection end of the second coupler, and the signal coupling circuit and the signal detector are electrically connected in series between the first signal port and the processing unit, and the detecting method comprising the steps of:

generating, by the signal generator, a test signal;
sending the test signal, by the signal generator and via the switch module and through the first coupler of the signal coupling circuit, to the first signal port from a third connection end of the second coupler and test the state of connection of the first signal port in a test process;
producing a detection signal, by the signal detector, according to the state of connection of the first signal port; and
determining, by the processing unit, the state of connection between the first signal port and the first external device according to a result of comparison between a voltage of the detection signal and a threshold value.

15. The detecting method of claim 14, wherein the determining step further comprises:
comparing the voltage of the detection signal with the threshold value; and
sending an alert message indicative of the abnormal connection state when the voltage of the detection signal is larger than the threshold value.

16. The detecting method of claim 14, wherein the determining step further comprises:
converting the detection signal into a digital signal value;
comparing the digital signal value with the threshold value; and sending an alert message indicative of the abnormal connection state when the digital signal value is larger than the threshold value.

17. The detecting method of claim 16, further comprising, after the determining step, stopping generating the test signal such that the first signal port is turned off, and thereby ends the test process.

18. The detecting method of claim 14, wherein after the determining step further comprises the steps of:
   turning on a second signal port and the test signal is sent to the second signal port;
   receiving a reflection signal attributed to the test signal reflected off the second signal port; and
   comparing a voltage of the reflection signal with the other threshold value to determine a state of matching between the second signal port and a second external device.

19. The detecting method of claim 18, wherein the step of determining the state of the matching between the second signal port and the second external device further comprises:
   sending an alert message indicative of the abnormal matching state when the voltage of the reflection signal is larger than the other threshold value.

20. The detecting method of claim 18, further comprising, after the step of determining the state of the matching between the second signal port and the second external device, stopping generating the test signal such that both of the first signal port and the second signal port are turned off, and thereby ends the test process.

\* \* \* \* \*